(12) United States Patent
Russell et al.

(10) Patent No.: US 10,279,994 B2
(45) Date of Patent: May 7, 2019

(54) SELECTIVELY MOBILE WASTE RECEPTACLES AND METHODS

(71) Applicant: Rubbermaid Commercial Products LLC, Atlanta, GA (US)

(72) Inventors: Christopher Loren Russell, Huntersville, NC (US); Adam Luedke, Kalamazoo, MI (US); Jacob Wayne Connelly, Concord, NC (US); Gary DeCarr, Fort Mill, SC (US)

(73) Assignee: Rubbermaid Commercial Products LLC, Atlanta, GA (US)

( * ) Notice: Subject to any disclaimer, the term of this patent is extended or adjusted under 35 U.S.C. 154(b) by 0 days.

(21) Appl. No.: 16/113,842

(22) Filed: Aug. 27, 2018

(65) Prior Publication Data

US 2019/0062049 A1 Feb. 28, 2019

Related U.S. Application Data

(60) Provisional application No. 62/550,029, filed on Aug. 25, 2017.

(51) Int. Cl.

| | |
|---|---|
| *B65F 1/06* | (2006.01) |
| *B65F 1/14* | (2006.01) |
| *B60B 33/00* | (2006.01) |
| *B60B 33/06* | (2006.01) |
| *B65F 1/00* | (2006.01) |

(52) U.S. Cl.
CPC ........ *B65F 1/1473* (2013.01); *B60B 33/0068* (2013.01); *B60B 33/06* (2013.01); *B65F 1/0073* (2013.01); *B65F 1/06* (2013.01); *B65F 1/1426* (2013.01)

(58) Field of Classification Search
CPC ....... B65F 1/1468; B65F 1/141; B65F 1/1473
See application file for complete search history.

(56) References Cited

U.S. PATENT DOCUMENTS

| | | | | |
|---|---|---|---|---|
| 6,827,357 | B2 * | 12/2004 | Calmeise | A47L 13/51 280/47.34 |
| 10,093,335 | B2 * | 10/2018 | Thuma | B62B 5/0006 |
| 2008/0246239 | A1 * | 10/2008 | Connor | B65F 1/122 280/47.26 |
| 2017/0217678 | A1 * | 8/2017 | Uffner | B65F 1/1473 |

* cited by examiner

*Primary Examiner* — Bryan A Evans
(74) *Attorney, Agent, or Firm* — Eversheds Sutherland (US) LLP

(57) ABSTRACT

Waste receptacles and retractable casters for such waste receptacles are provided. The waste receptacle includes a housing that has an inner volume accessible by an opening. The housing also includes a base. The waste receptacle includes at least one foot attached to the base that is configured to support the waste receptacle in a standing position. On the housing is at least one retractable caster assembly with a caster moveable between a retracted position and an extended position in which the caster extends past the at least one foot to engage a surface on which the waste receptacle is placed. The waste receptacle is selectively disposed in either a standing position or a mobile position in which the receptacle is moveable along the surface by the retractable caster assembly.

17 Claims, 13 Drawing Sheets

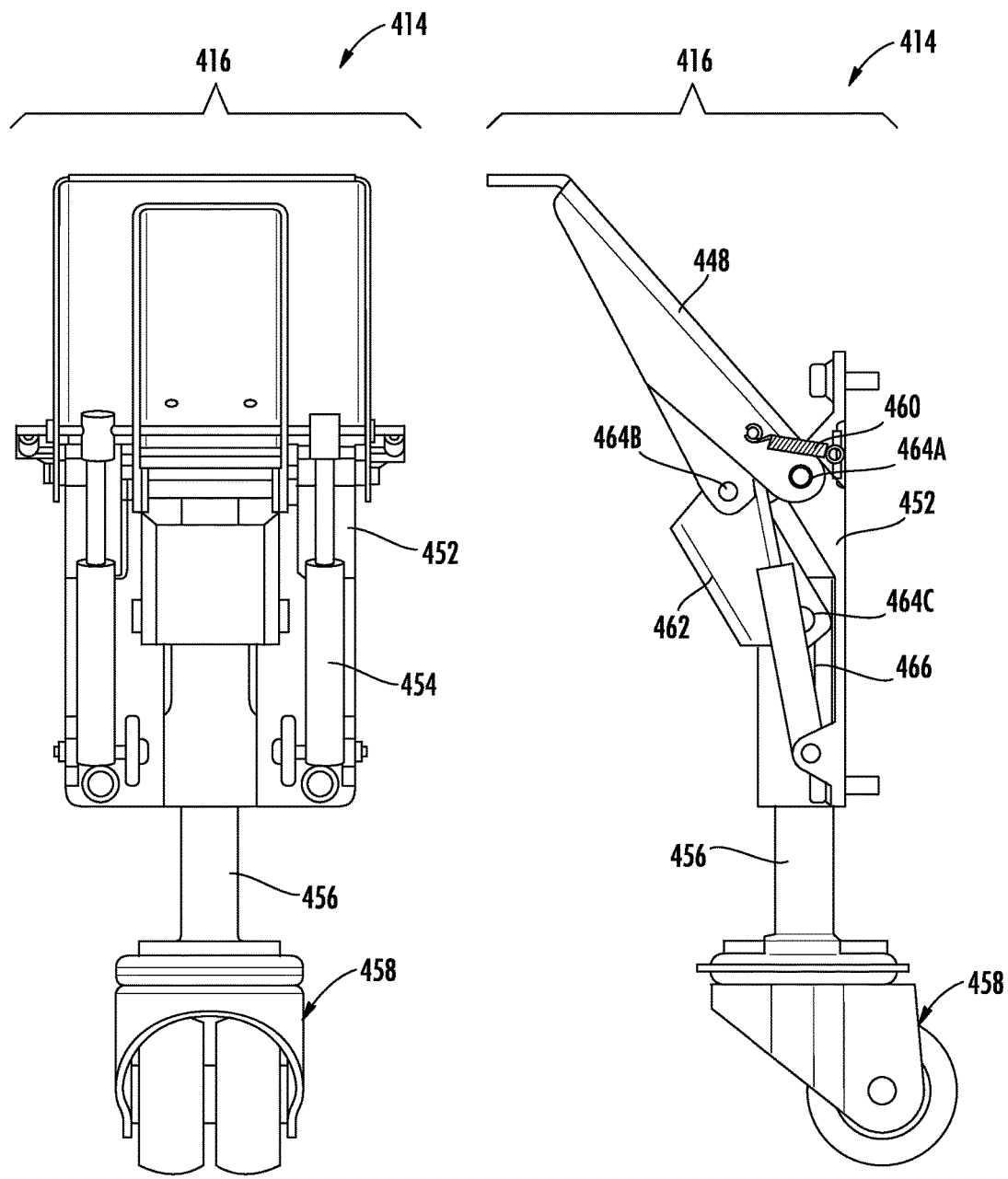

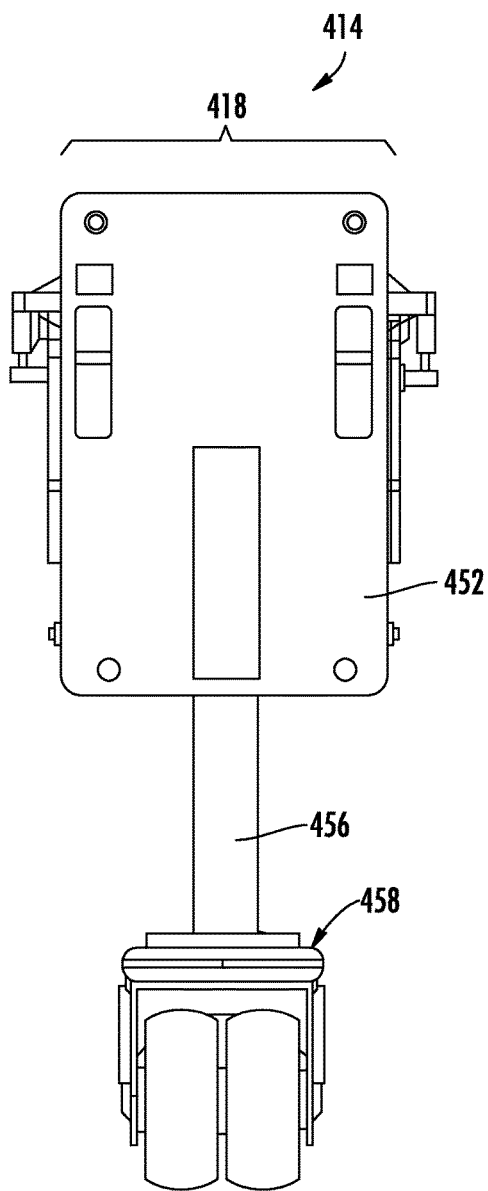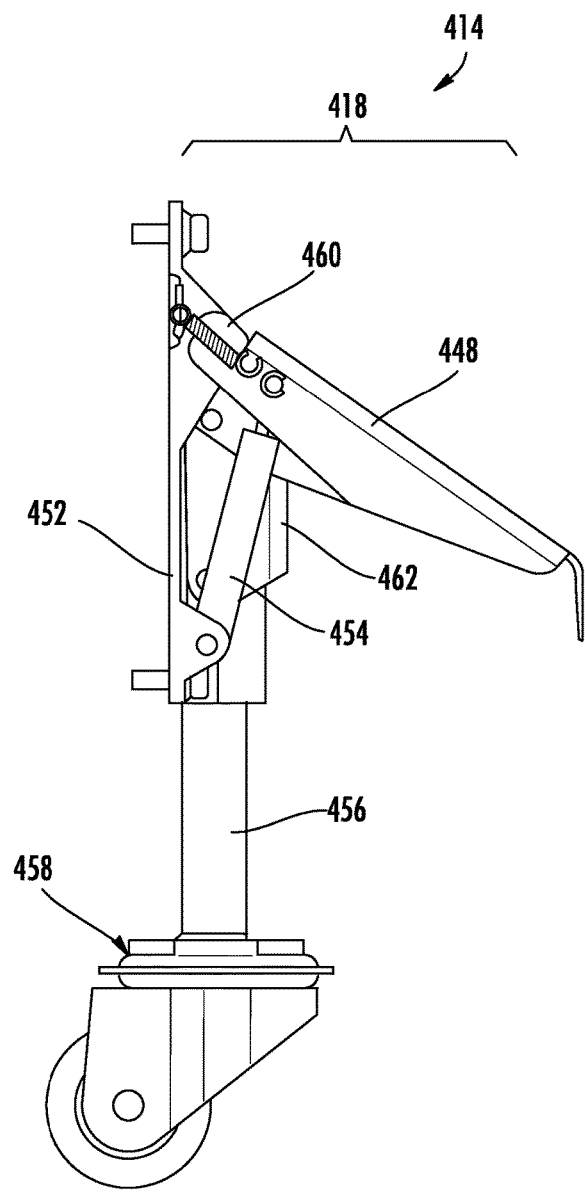

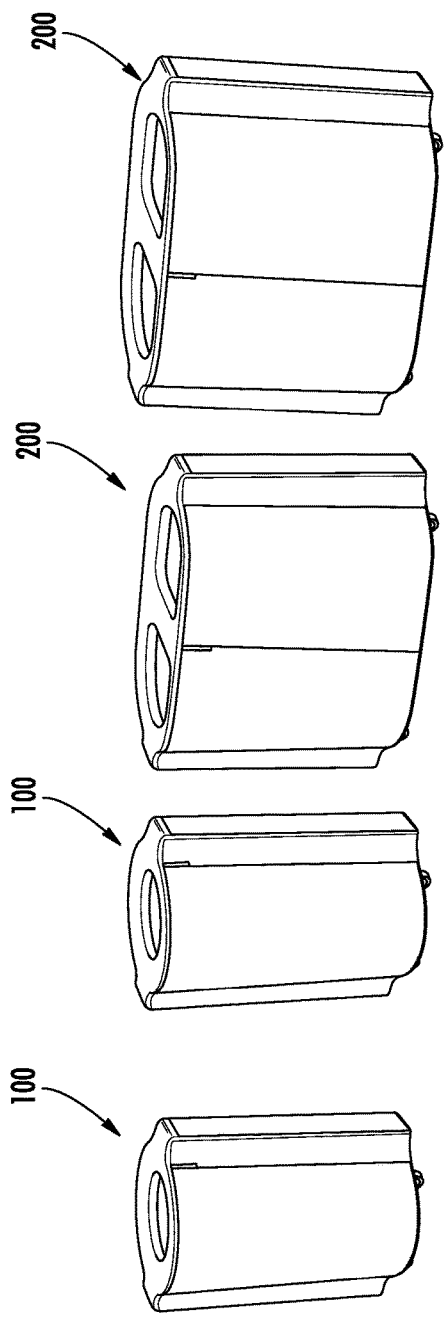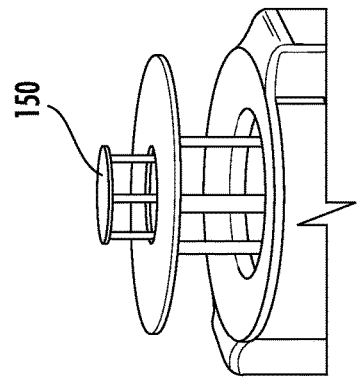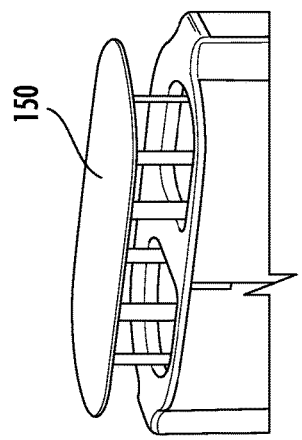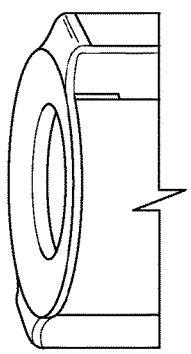

SELECTIVELY MOBILE WASTE RECEPTACLES AND METHODS

CROSS-REFERENCE TO RELATED APPLICATIONS

This application claims priority to and the benefit of U.S. Provisional Patent Application No. 62/550,029, filed Aug. 25, 2017, which is herein incorporated by reference in its entirety.

FIELD OF THE DISCLOSURE

The disclosure relates to waste receptacles and more specifically to waste receptacles that are selectively movable between positions of mobility.

BACKGROUND

Waste receptacles, especially large commercial receptacles, may have limited mobility, which complicates repositioning and cleaning around such receptacles. Typically, such large receptacles must be lifted or slid for cleaning, or are mounted to a wall or pole such that they can be suspended from the floor during cleaning. Mobile waste receptacles having a plurality of casters on which the receptacle rests upon are known; however, such receptacles may not be suitable for commercial or public uses in which it is desired to limit access to the mobile configuration of the receptacle (i.e., to prevent unintended movement of the receptacle).

SUMMARY

In one aspect, a waste receptacle is provided, including a housing that has an inner volume accessible via an opening. The housing includes a base. The waste receptacle includes at least one foot attached to the base and configured to support the waste receptacle in a standing position. At least one retractable caster assembly is associated with the housing. The retractable caster assembly includes a caster moveable between a retracted position and an extended position in which the caster extends past the at least one foot to engage a surface on which the waste receptacle is disposed. The waste receptacle is selectively configured in either a standing position and/or a mobile position in which the receptacle is movable along the surface by the retractable caster assembly.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 9B is a rear view of one embodiment of the retractable caster assembly of FIG. 9A in a retracted position.

FIG. 9C is a side view of one embodiment of the retractable caster assembly of FIG. 9A in the retracted position.

FIG. 9D is a rear view of one embodiment of the retractable caster assembly of FIG. 9A in an extended position.

FIG. 9E is a side view of one embodiment of the retractable caster assembly of FIG. 9A in an extended position.

FIG. 12A is a perspective view of one embodiment of a waste receptacle.

FIG. 12B is a perspective view of one embodiment of a waste receptacle.

FIG. 12C is a perspective view of one embodiment of a waste receptacle.

FIG. 12D is a perspective view of one embodiment of a waste receptacle.

FIG. 13A is a perspective view of one embodiment of an opening of a waste receptacle.

FIG. 13B is a perspective view of one embodiment of an opening and a rain hood disposed on a waste receptacle.

FIG. 13C is a perspective view of one embodiment of an opening and a rain hood disposed on a waste receptacle.

DETAILED DESCRIPTION

Waste receptacles that are selectively mobile have been developed. The waste receptacles may be suitable for use in commercial or public settings in which it is desirable to limit public access to the mobile configuration of the receptacle, to prevent unintended movement of the receptacle. Generally, the waste receptacles described herein may have any known or suitable size and design. Examples of certain receptacle designs that may be used in combination with a selective mobility mechanism described herein are illustrated in FIGS. 12A-12D.

Figure 1:
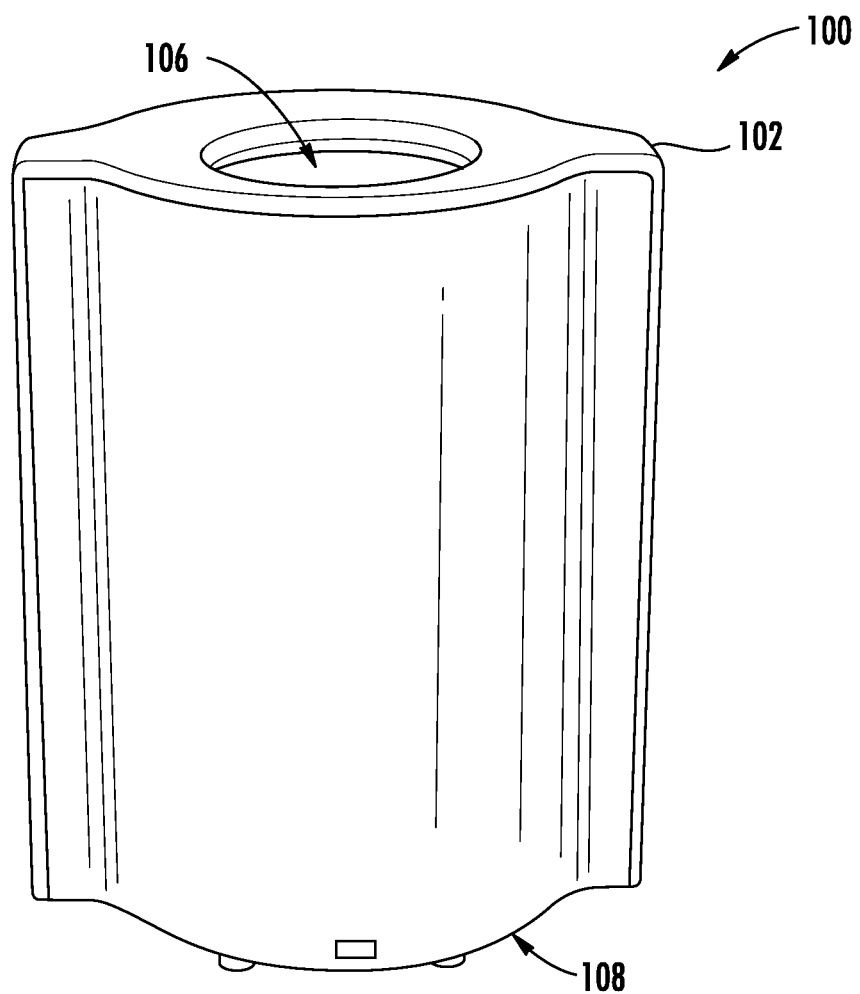
FIG. 1 is a perspective view of one embodiment of a waste receptacle.

In certain embodiments, as shown in FIG. 1, a waste receptacle 100 includes a receptacle housing 102 defining an inner volume accessible via an opening 106 and having a base 108. For example, the base 108 may be integral with, coupled to, or separate from the receptacle housing 102. For example, the base 108 may be parallel to the floor (e.g., relative to a surface on which the receptacle rests) or may at least partially disposed in another orientation (e.g., a transverse to the floor, relative to a surface on which the receptacle rests) of the waste receptacle 100.

Figure 2:
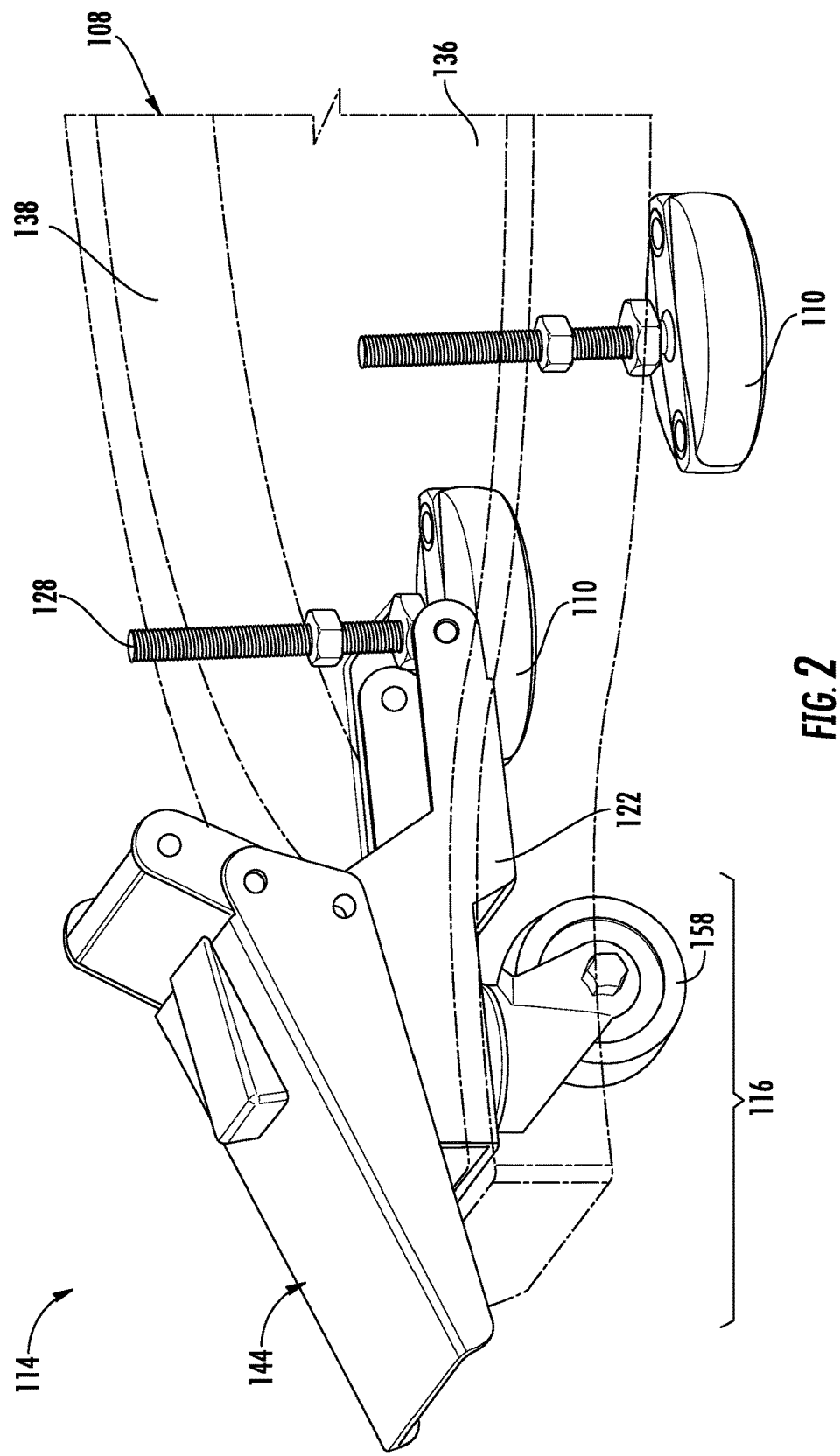
FIG. 2 is a perspective view of one embodiment of a retractable caster assembly and a foot of a waste receptacle.
Figure 3A:
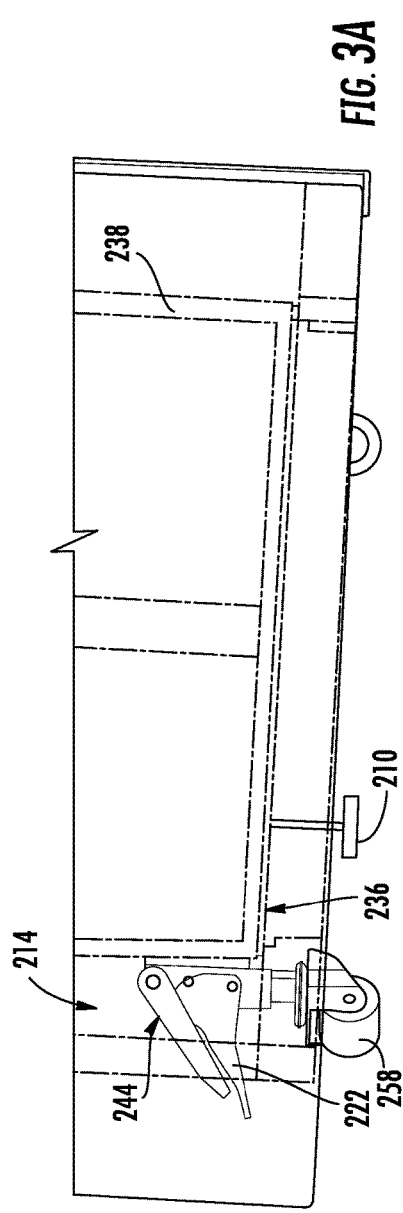
FIG. 3A is a side x-ray view of one embodiment of a retractable caster assembly in an extended position.
Figure 3B:
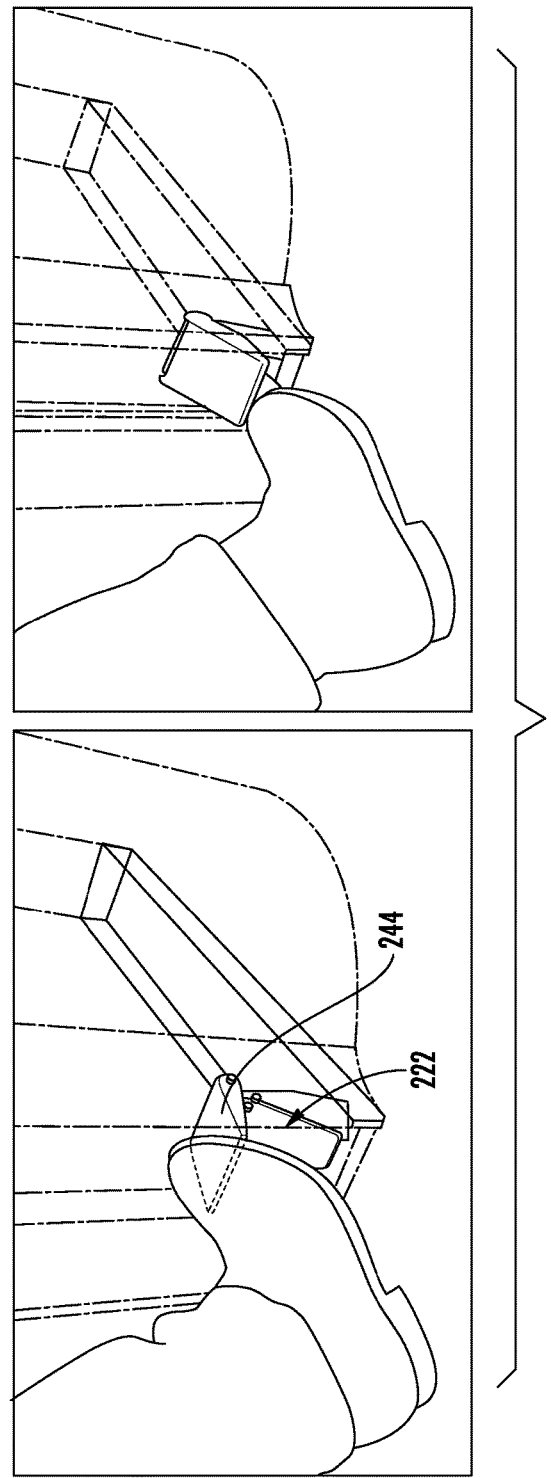
FIG. 3B is a progression view of one embodiment of the retractable caster assembly of FIG. 3A actuating between a retracted position and the extended position.
Figure 4:
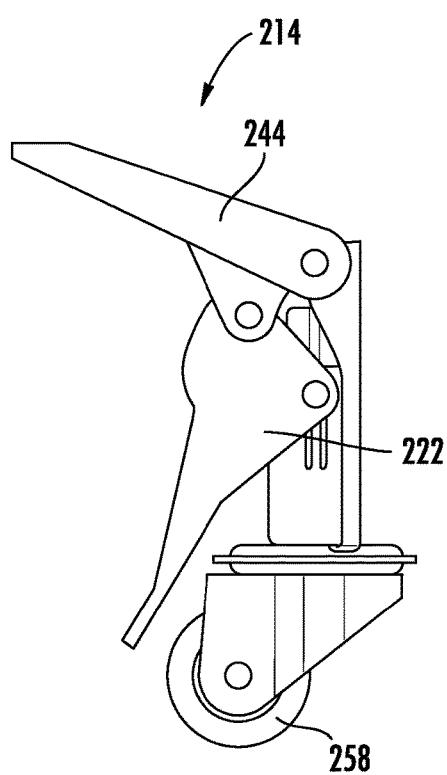
FIG. 4 is a side view of one embodiment of the retractable caster assembly of FIG. 3A.
Figure 5:
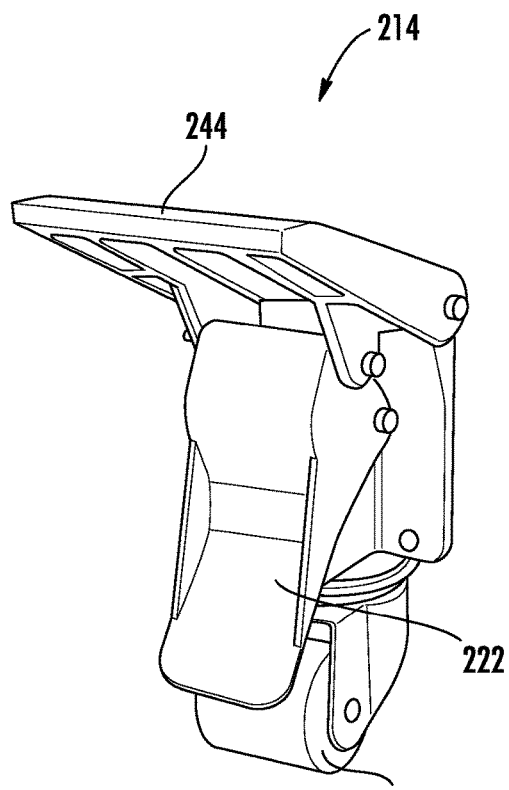
FIG. 5 is a perspective view of one embodiment of the retractable caster assembly of FIG. 3A.

In some embodiments, as shown in FIG. 2, the receptacle includes at least one foot 110 fixedly coupled to the base 108 and configured to support the waste receptacle 100 in a standing position. As used herein, the term "coupled" refers to two structures being directly or indirectly mounted together, such as through suitable attachment means (e.g., chemical and/or mechanical means). Thus, the at least one foot 110 is coupled in a fixed position with respect to the base 108 such that the at least one foot 110 provides a support structure for elevating the receptacle body off of a surface on which it is disposed. In certain embodiments, the receptacle includes two or more feet that are fixedly coupled to the base 108. For example, FIG. 2 illustrates an embodiment having two feet 110 fixedly coupled to the base 108. The feet 110 may have any suitable design, such as an adjustable lift rod 128 in combination with a flat disc or other suitable floor-engaging surface.

As shown in FIG. 2, the waste receptacle also includes at least one retractable caster assembly 114 coupled to the base 108, such that a caster 158 of the retractable caster assembly is selectively movable between a retracted position and an extended position (e.g., as shown in another embodiment illustrated by FIGS. 9B and 9C, respectively). In the extended position, the caster 158 extends past the at least one foot 110 to engage the surface on which the waste receptacle is disposed. That is, the retractable caster assembly 114 may be selectively positioned by a user in a retracted position 116 in which the caster 158 is disposed in a retracted position 116 such that it is not in contact with the surface on which the waste receptacle 100 is disposed (e.g., a floor). When the retractable caster assembly 114 is in the retracted position 116, the one or more fixed feet along with any fixed casters 226 (discussed below) are configured to contact the floor surface and provide a stable support structure for the waste receptacle 100. The casters may be any suitable caster or wheel design, such as swivel casters, and may be made from any suitable materials.

While the figures illustrate the at least one foot 110 and/or the at least one retractable caster assembly 114 being coupled to a lower base portion 136 that is generally parallel to the floor, it is also envisioned that the feet 110 and/or casters 158 may be coupled at other suitable base 108 portions of the receptacle, such as on a sidewall portion 138 or a transition portion between the lower base portion 136 and a sidewall portion 138, all of which are considered to fall within the scope of the term "base" as used herein.

Thus, the waste receptacle 100 is selectively configurable in a first standing position in which the receptacle is supported by its feet and any fixed casters 226, and in a second mobile position in which the waste receptacle 100 is movable along the surface via the at least one retractable caster assembly 114.

In certain embodiments, as shown in FIG. 2, the retractable caster assembly 114 is selectively movable between the retracted position and the extended position (e.g., as shown in FIGS. 9C and 9E, respectively) via a pedal-actuated lever 122 and a pedal 144. For example, the lever 122 may be any suitable mechanism for selectively moving the caster 158 between the extended and the retracted position 116. For example, FIG. 2 illustrates a lever mechanism 122 having a horizontal lever arm, i.e., the linkage is substantially parallel to a floor surface on which the waste receptacle 100 sits.

In some embodiments, as shown in FIGS. 3A-5, the retractable caster assembly 214 includes a pedal 244 and a pedal-actuated lever 222 configured to adjust the caster 258 between a retracted and an extended position. For example, in the embodiment shown in FIGS. 4-5, a user may actuate the distal end of pedal 244 (i.e., opposite the caster wheel) to engage the caster into the mobile position (not shown) and may actuate the adjacent pedal-actuated lever 222 to the distal end pedal 244 to retract the caster so that the receptacle is in the standing position. The lever mechanism 222 may be made of any suitable materials and designs, including all sheet metal, plastic, and die-cast materials.

Figure 6:
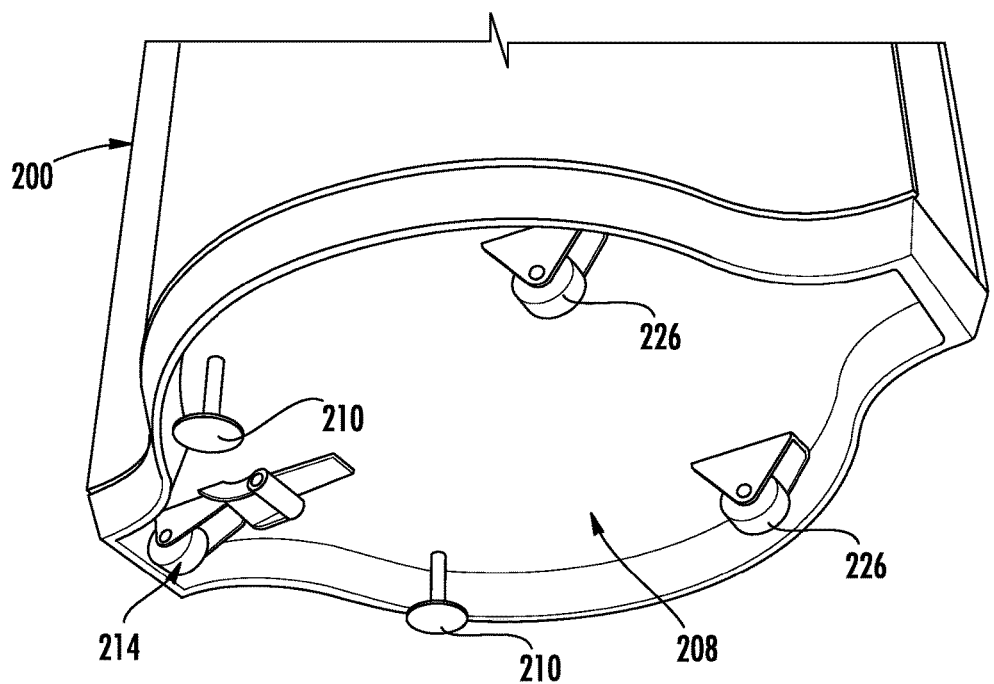
FIG. 6 is a bottom perspective view of one embodiment of a waste receptacle and a retractable caster assembly.

In some embodiments, as shown in FIG. 6, at least one fixed caster 226, foot 210, and retractable caster assembly 214 are disposed on the base 208 of the receptacle 200. In some instances, two fixed casters 226 may be disposed on the base 208. In other instances, any number of fixed casters 226 may be disposed on the base 208. In some instances, two feet 210 may be disposed on the base 208. In other instances, any number of feet 210 may be disposed on the base 208. As shown in FIG. 6, a retractable caster assembly 214 is disposed on one end of the base 208 and configured to selectively extend past the feet 210. That is, once the caster of the retractable caster assembly 214 is in an extended position (not shown), the receptacle balances on the various casters disposed on the base 208. Any one of the receptacle caster assemblies disclosed herein may be coupled to the receptacle in various positions.

Figure 7:
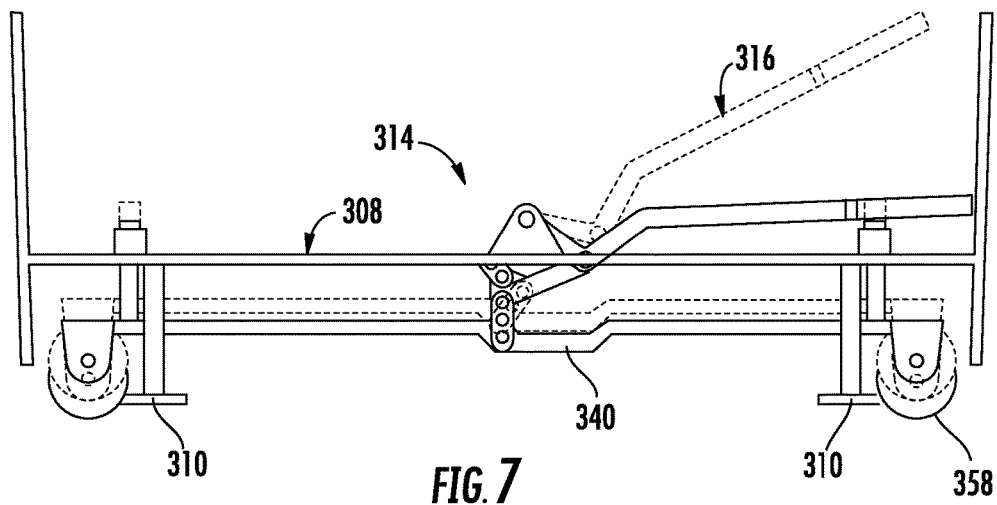
FIG. 7 is a side view of one embodiment of a retractable caster assembly.

FIG. 7 illustrates one embodiment of a retractable caster assembly 314 for use in the waste receptacles described herein. In this embodiment, the waste receptacle 300 includes at least two fixed feet 310 coupled to the base 308 and at least two retractable casters 358. The retractable casters 358 are each coupled to a retractable member 340 configured to retract the at least two retractable casters 358 simultaneously. For example, the retractable member 340 may be a suitable cross-bar or shaft to which each of the retractable casters 358 is coupled and which is configured to be moved into the retracted position 316 by a user (e.g., as shown in dashed lines on FIG. 7). For example, the retractable member 340 may be an over-center locking lift driven by a pedal.

Figure 8:
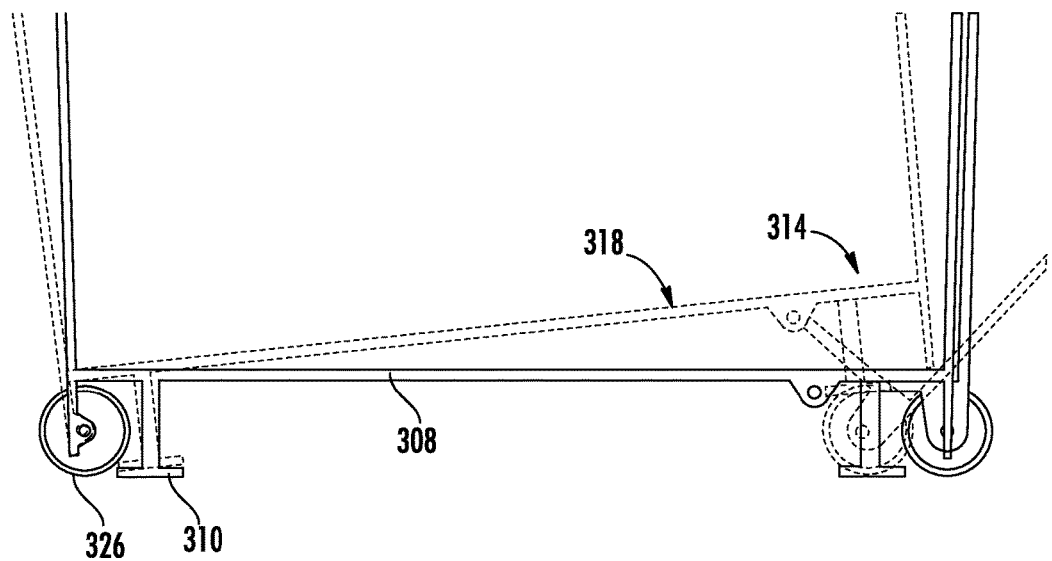
FIG. 8 is a side view of one embodiment of a retractable caster assembly.

As shown in FIG. 8, in another embodiment, the waste receptacle comprises at least one fixed caster 326 fixedly coupled to the base 308, the at least one fixed caster 326 being sized and positioned such that the at least one fixed caster 326 and the at least one foot 310 provide an approximately level support structure for the waste receptacle in the standing position. Thus, in such embodiments, when the retractable caster assembly 314 is retracted, the waste receptacle is supported by the feet and the fixed casters 326, with the feet substantially preventing movement of the waste receptacle via the fixed casters 326. As shown in FIG. 8, when the retractable caster assembly 314 is in its extended position 318 (e.g., as shown in dashed lines on FIG. 8), the receptacle is lifted off its fixed feet and a portion of the receptacle is elevated, such that the receptacle is no longer level, and only the casters remain in contact with the floor surface. In some instances, the at least one foot 310 is disposed proximate the at least one retractable caster assembly 314, relative to the at least one fixed caster 326.

In certain embodiments, the waste receptacle comprises at least one fixed caster and at least one retractable foot, which is operable to retract and extend in the same way described herein with respect to the retractable casters. That is, one or more feet may be retractable, instead of or in combination with one or more retractable casters, such that the feet may be retracted to engage one or more fixed casters for moving the waste receptacle.

One embodiment of a retractable caster assembly 414 is shown in FIGS. 9A-9E. As shown and discussed herein, the assembly includes a spring-actuated pedal 448 for operably raising and lowering the caster wheels 472. FIGS. 9A-9E show the retractable caster assembly 414 in a retracted position 416 and an extended (i.e., engaged) position 418.

Figure 9A:
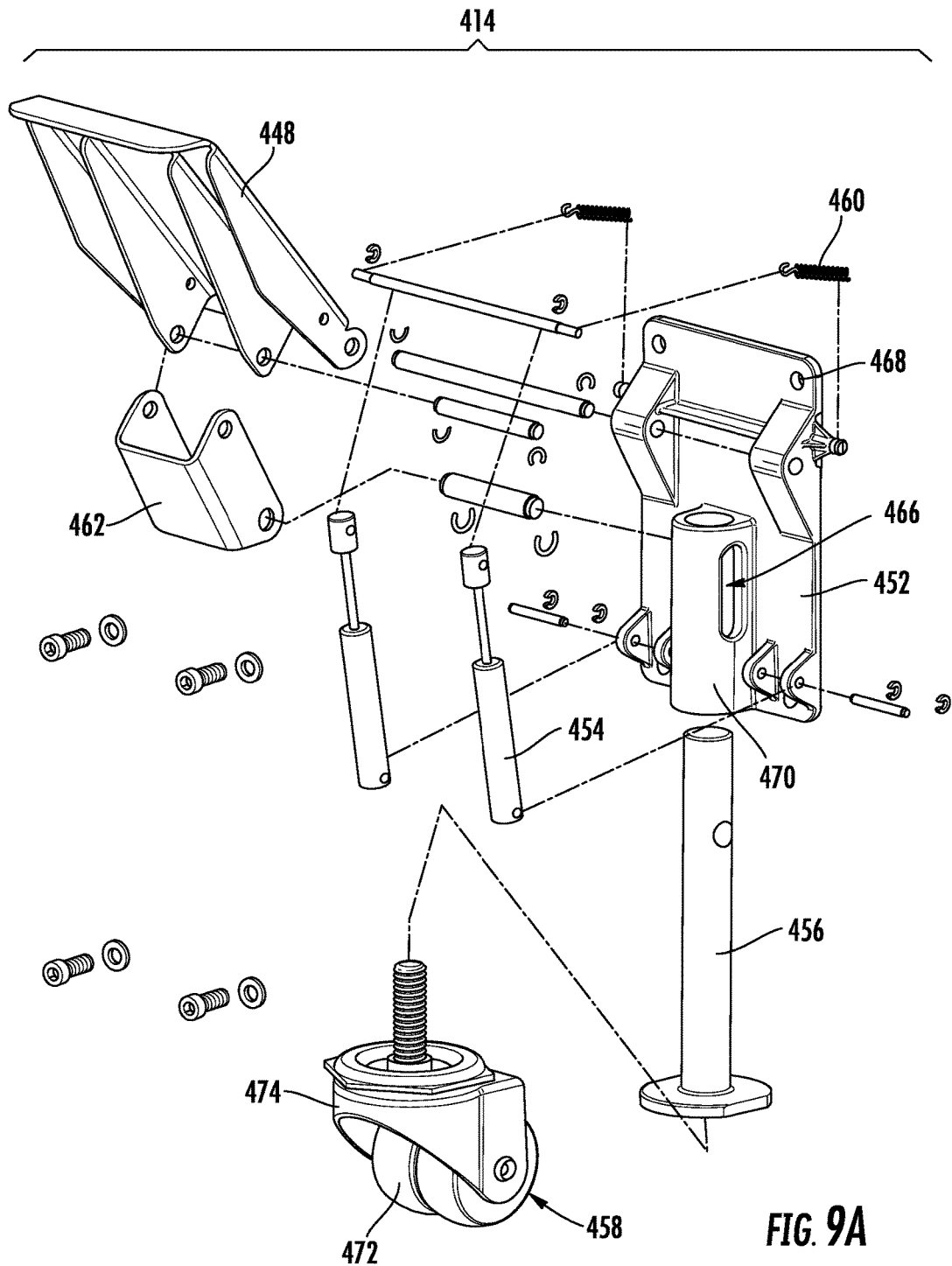
FIG. 9A is an exploded view of one embodiment of a retractable caster assembly.

In some embodiments, as shown in FIG. 9A, the retractable caster assembly 414 includes a mounting plate 452 configured to couple the retractable caster assembly 414 to the waste receptacle(s) as described herein. For example, the mounting plate 452 may have a plurality of apertures 468. The plurality of apertures 468 may receive a set of fasteners to secure the mounting plate 452 to the waste receptacle. In some instances, the mounting plate 452 may attach to the waste receptacle via adhesive, snaps, pins, or other attachment mechanisms.

In some embodiments, the mounting plate 452 includes a tubular channel 470 through which a caster mounting sleeve 456 is operable to slide the caster 458 from the retracted position 416 to the extended position 418. For example, as discussed herein, the caster mounting sleeve 456 may be disposed and partially anchored (e.g., limited movement on one axis) within the tubular channel 470. The tubular channel 470 may include an elongated aperture 466 configured to receive a fastener (e.g., a pin). That is, a fastener that may thread or otherwise be operably disposed through the elongated aperture 466 and the caster mounting sleeve 456. The fastener may anchor the caster mounting sleeve 456 within the elongated aperture 466 to allow it to slide in a direction parallel to the mounting plate 452. In some instances, as discussed later, the caster mounting sleeve 456 may be anchored to a release member 462 via a caster mounting sleeve pivot point 464C. For example, the caster mounting sleeve 456 may move in tandem with the release member 462. In other instances, the caster mounting sleeve 456 may move in a variety of other directions or by other mechanisms.

In some embodiments, the at least one retractable caster assembly 414 includes a pedal 448 and a release member 462 configured to work in concert to move the caster 458 between the retracted position 416 and the extended position 418. The pedal 448 and release member 462 may be coupled via a plurality of pivot points (e.g., pivot points 464A/464B/464C). The pedal 448 and release member 462 may be anchored about the pivot points by pins. In other instances, the pedal 448 and release member 462 may be pivotable about the pivot points by another suitable fastener or mechanism, such as a screw, bearing, bolt, or rivet, among others.

In some embodiments, as shown in FIGS. 9B-9E, the pedal 448 and release member 462 are configured to actuate the caster mounting sleeve 456 between the retracted position 416 and the extended position 418. For example, when the pedal 448 is in the retracted position 416 (e.g., as shown in FIGS. 9B and 9C), the pedal is rotated away from the caster 458. The pedal 448 rotates about a mounting plate pivot point 464A, and simultaneously pulls on the release member 462 via the at least one release member pivot point 464B. As the release member 462 is pulled by pedal 448, the caster mounting sleeve pivot point 464C slides up the elongated aperture 466. In some instances, the release member 462 may be a u-shaped joint as shown in FIG. 9A. In other instances, the release member 462 may be another shape, such as cylinder, t-shaped joint, or some other type of connection. As the release member 462, and consequently the release member pivot point 464B, slide up the tubular channel 470, the caster mounting sleeve 456 retracts within the tubular channel 470.

In some embodiments, as shown in FIGS. 9D-9E, the pedal 448 and release member 462 are configured to extend the caster mounting sleeve 456 to an extended position 418. For example, when the pedal 448 is in the extended position 418, the pedal is rotated towards the caster 458. The pedal rotates about the mounting plate pivot point 464A, and simultaneously pushes on the release member 462 via the at least one release member pivot point 464B. As the release member 462 is pushed by the pedal 448, the release member pivot point 464C slides down the elongated aperture 466. As the release member 462, and consequently the release member pivot point 464B, slide down the tubular channel 470, the caster mounting sleeve 456 protrudes from the tubular channel 470 into an extended position. Further, as the pedal 448 rotates towards the caster 458, the damper 454 compresses. In some instances, the weight of the receptacle (not shown) coupled to the mounting plate 452 is configured to prevent counter-rotation until overcome by an opposite force on the pedal 448.

In some embodiments, the at least one retractable caster assembly 414 includes a set of dampers 454 and biasing members 460 configured to slow and/or hold the pedal 448 into place in the selected retracted position 416 or extended position 418. For example, each damper 454 may couple to the mounting plate 452 at a first end and attach to the pedal 448 at a second end. As the pedal 448 rotates about the pivot point 464A (e.g., as shown in FIG. 9C), the damper 454 may compress and provide a counteracting force against the pedal 448. Conversely, the biasing member 460 disposed on the mounting plate 452 and couple to the pedal 448 may provide a substantially perpendicular force to the damper 454. That is, as the pedal 448 rotates about the pivot point 464A, the biasing member 460 may be configured to encourage (e.g., apply a tension force) the pedal 448 away from the caster 458. In turn, as discussed herein, the pedal 448 pulls the caster mounting sleeve 456 within the tubular channel 470.

In some embodiments, the at least one retractable caster assembly 414 includes a caster 458 disposed on one end of the caster mounting sleeve 456. The caster 458 may be configured to operably roll in any direction on a surface (i.e., ground or flooring). For example, the caster 458 may include one or more wheels 472 disposed within a swivel head 474. The swivel head 474 may rotate the wheel three-hundred and sixty degrees on two perpendicular axes. For example, a first axis (not shown) extends through the center of the wheel(s) 472, and the wheel(s) 472 may spin about that axis (i.e., an axis through the center of the swivel head 474). Further, a second axis (not shown) may extend perpendicularly to the first axis (i.e., in the direction of a longitudinal axis of the caster mounting sleeve) and the wheels 472 may rotate three-hundred and sixty degrees about the second axis.

In some embodiments, the receptacle includes a locking mechanism to lock the waste receptacle in the standing position or in the mobile position. For example, as mentioned above, the locking mechanism may be associated with the pedal-actuated lever.

Figure 10A:
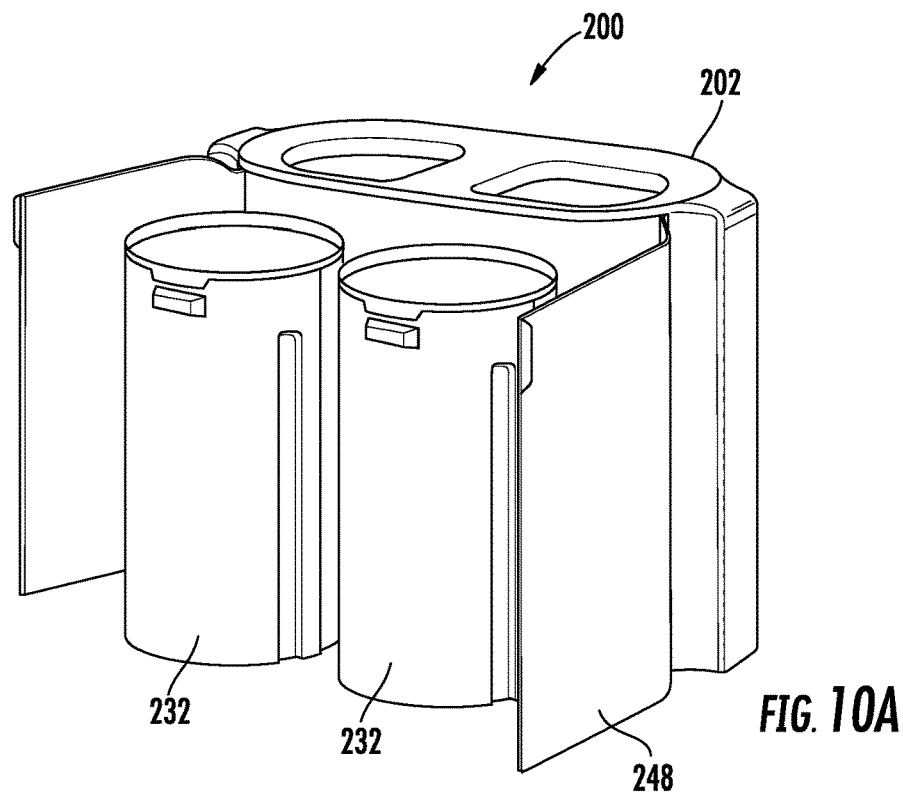
FIG. 10A is a perspective view of one embodiment of a waste receptacle.
Figure 10B:
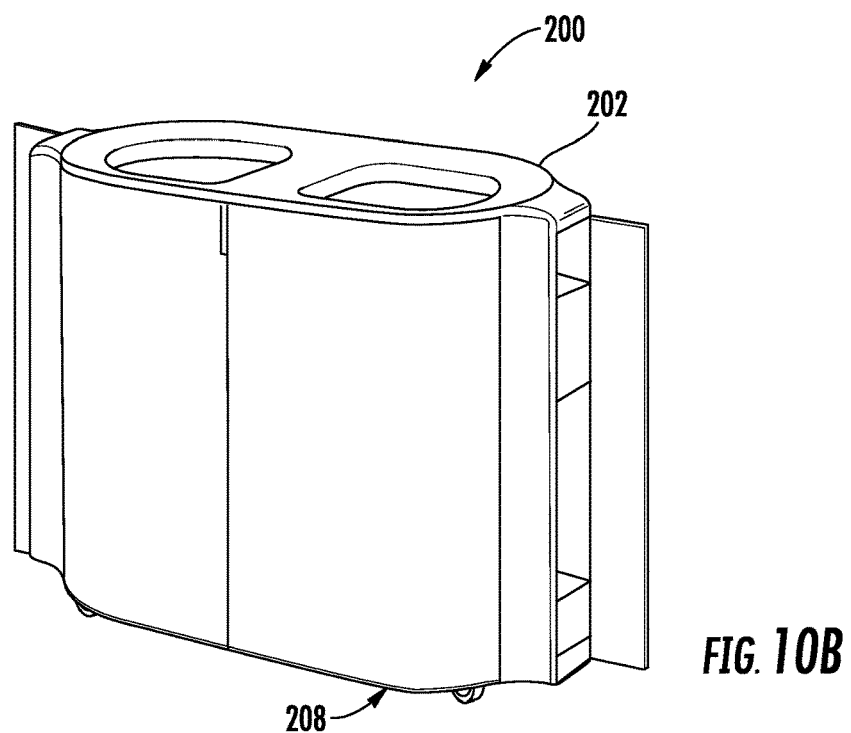
FIG. 10B is a perspective view of the waste receptacle of FIG. 10A.
Figure 11A:
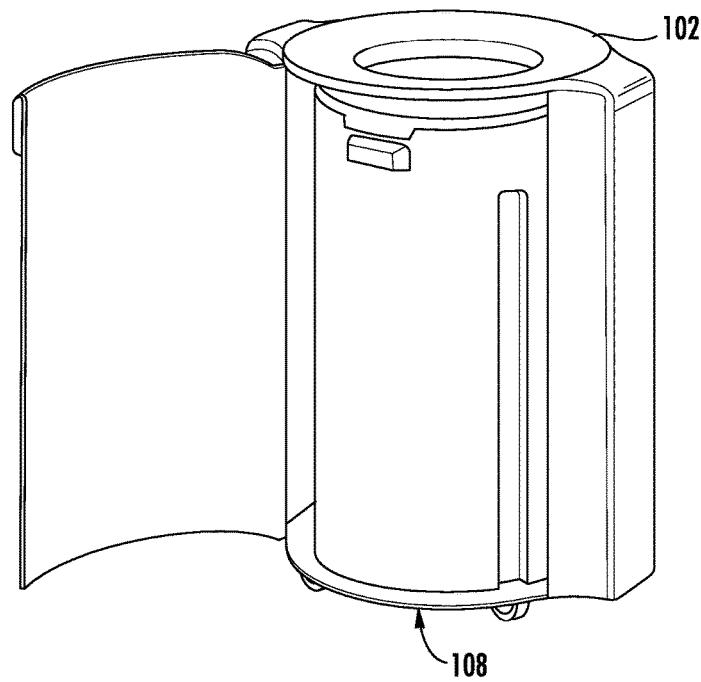
FIG. 11A is a perspective view of one embodiment of a waste receptacle.
Figure 11B:
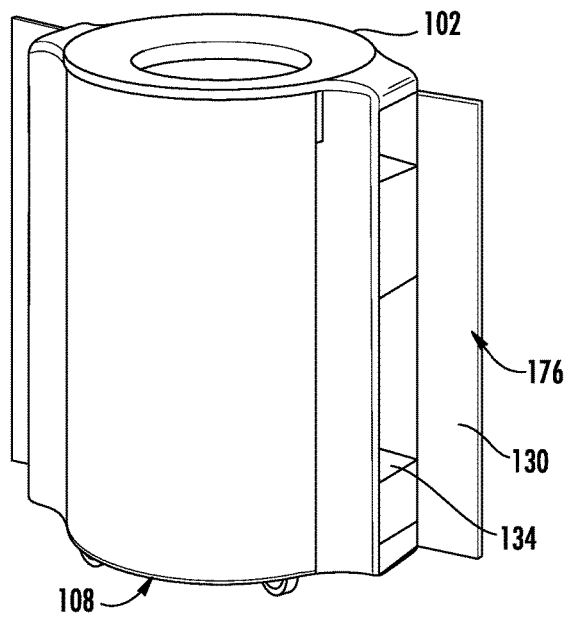
FIG. 11B is a second perspective view of one embodiment of the waste receptacle of FIG. 11A.
Figure 11C:
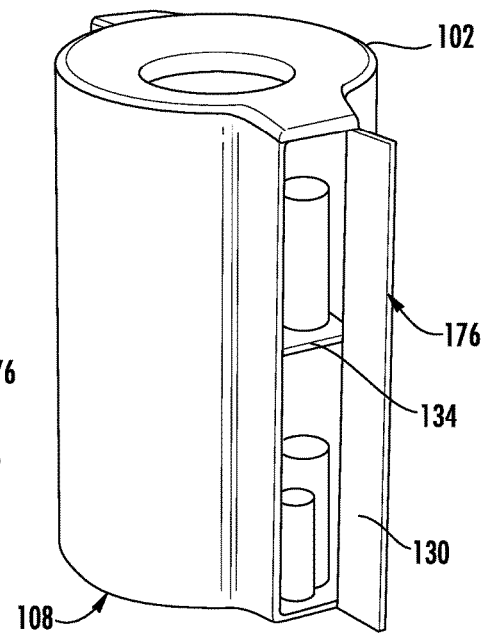
FIG. 11C is a perspective view of one embodiment of a set of internal storage shelves within the waste receptacle of FIG. 11A.

As mentioned above, any suitable waste receptacle designs may be manufactured with the disclosed selective mobility feature. In certain embodiments, as shown in FIGS. 11A-11C, the waste receptacle 100 includes a housing 102 having a substantially circular, oval, elliptical or other suitably shaped base 108 portion with sidewalls extending therefrom, to form an inner volume to receive one or more receptacle liners 132 (e.g., as shown in FIG. 10A plastic trash cans 232, such as 33 or 45 gallon cylindrical trash cans). For example, the housing base 108 may be the base 108 to which the casters and feet are coupled. Alternatively, the casters and feet may be coupled to another base 108 surface that the housing 102 surrounds or covers.

In certain embodiments, as shown in FIGS. 10A and 11A, the waste receptacle 200 housing 202 includes a selectively openable panel 248 through which the receptacle liner(s) 232 (not shown) is positionable within the waste receptacle. Such panel 148 may allow the liner can 132 to be pulled from the housing 102 for improved positioning when removing full liner 132 bags (i.e., trash bags).

In some embodiments, as shown in FIGS. 11A-11C, the housing 102 also includes one or more integral storage lockers 176 at an end of the housing 102. For example, the storage locker 176 may include at least one internal storage shelf 134 accessible by a door 130. Such locker may provide for the convenient storage of cleaning supplies, liner bags, wet floor signs, and more. The locker 176 may eliminate and/or reduce the need for maintenance personnel to carry supplies or make time consuming trips to the supply closet. Further, the storage locker 176 may have a slot or other connection through to the inner volume that receives the one or more receptacle liners 132, such that liner bags stored within the storage locker 176 can be pulled from the locker through to receptacle liner 132, for more efficient changing of liner bags.

Figure 14:
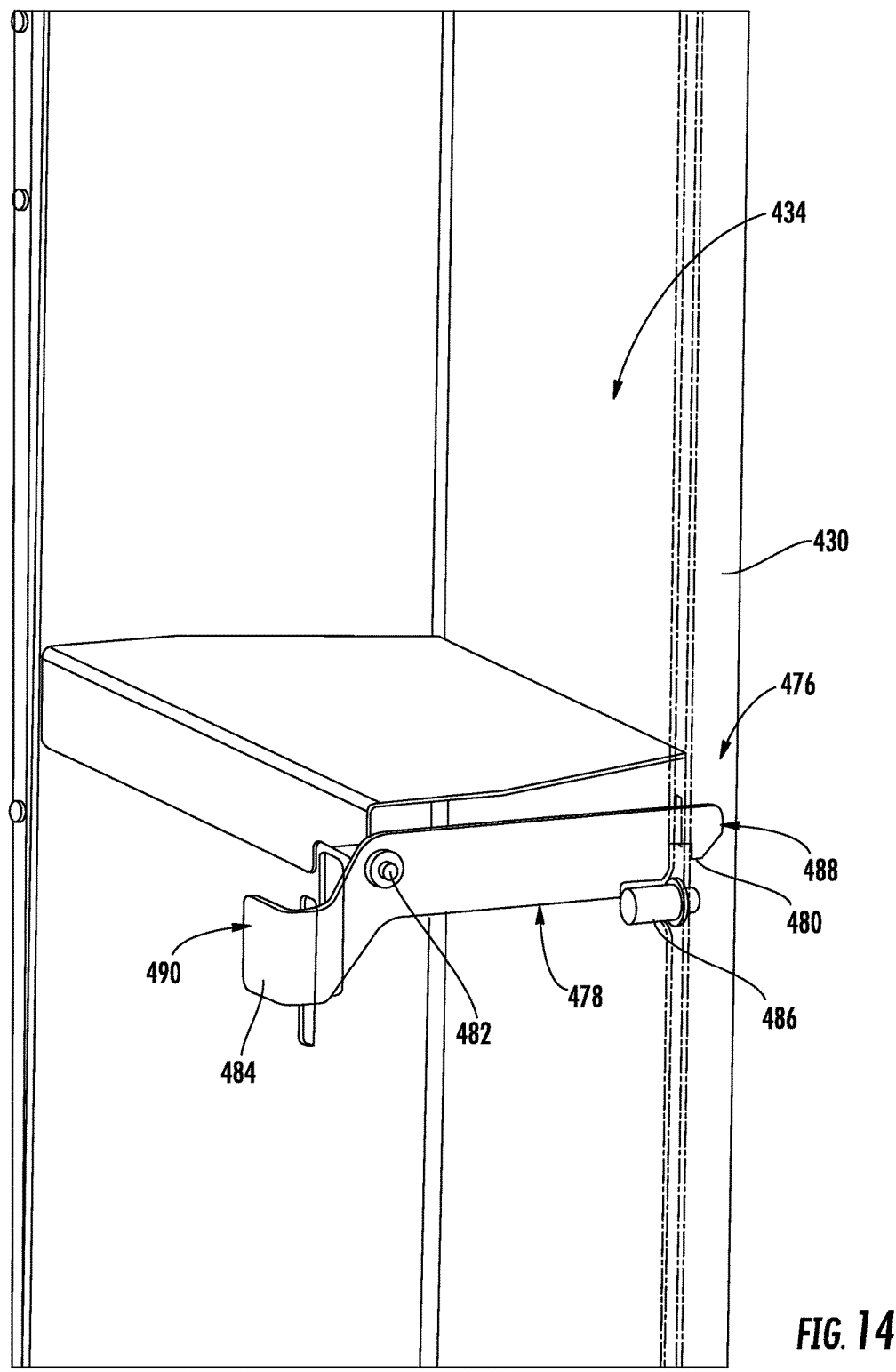
FIG. 14 is a perspective view of one embodiment of a latch within a waste receptacle.

In some embodiments, as shown in FIG. 14, the waste receptacle includes a latch 476 configured to secure the door 430 of the internal storage shelf 434. For example, the latch 476 may include a body 478 with a distal end 488 and an aft end 490. The distal end 488 of the body 478 may include an indented portion 480. The aft end 490 of the body may be disposed within the waste receptacle (e.g., with the inner volume that receives the liner 132) and include a handle portion 484. In some instances, the body 478 may rotate about a handle pivot point 482 to selectively secure the door 430. For example, the handle portion 484 may be used to rotate the body 478 about the handle pivot point 482. In some instances, the indented portion 480 may rotate onto a lock 486 disposed behind the door 430. Once the indented portion 480 rests within the lock 486, the lock 486 may be engaged via a key (not shown) to secure the door 430. The latch 476 may secure the door by a variety of other methods, including a temporary pin threading through the latch or another fastener anchoring the latch 476 onto the door 430, among others.

In certain embodiments, the casters and/or pedal of the retractable caseter mechanism (i.e., lift mechanism) may be concealed to prevent and/or minimize unwanted movement of the receptacle. For example, the pedal may be concealed within a storage locker or other area that is accessible by a door 130. For example, the casters may be substantially concealed when the receptacle is in the standing position by the housing 102 sidewall/base 108 extending substantially over the casters. For example, concealed wheels and/or pedals may allow the container to be quickly and easily moved by a single maintenance person for cleaning or relocating.

In certain embodiments, as shown in FIGS. 13A-13C, the waste receptacles described herein may have one or more of various suitable accessories, such as a rain hood 150 that prevents natural elements from entering receptacle or a smoking lid (i.e., cigarette receptacle). In some embodiments, the waste receptacle 100 may have one or more upper opening 106 through which a user may deposit waste materials. In some embodiments, the waste receptacle 100 includes one or more waste stream labels (e.g., landfill, recycling, etc.).

Methods of operating waste receptacles are also provided herein. In certain embodiments, methods of operating waste receptacles include providing any of the waste receptacle designs described herein and selectively retracting and extending the at least one retractable caster assembly to change the waste receptacle between the standing position and the mobile position in which the waste receptacle is movable along the surface via the at least one retractable caster assembly.

The waste receptacles and methods disclosed herein may provide an easy to move large format waste receptacle for use in locations where limited access to mobility is desired to prevent and/or minimize unintended movement. The waste receptacles may have a simple, one-step mechanism for switching between the mobile and stationary (e.g., standing) configurations.

It will be apparent to those skilled in the art that various modifications and variations can be made to the present disclosure without departing from the spirit and scope of embodiments of the disclosure. Thus, it is intended that the described embodiments cover the modifications and variations of the disclosure provided they come within the scope of the appended claims and their equivalents.

What is claimed is:

1. A waste receptacle, comprising:
   a housing defining an inner volume accessible via an opening, the housing comprising a base;
   at least one foot fixedly coupled to the base and configured to support the waste receptacle in a standing position; and
   at least one retractable caster assembly coupled to the housing, the at least one retractable caster assembly comprising a caster selectively movable between a retracted position and an extended position in which the caster extends past the at least one foot to engage a surface on which the waste receptacle is disposed,
   wherein the retractable caster assembly comprises:
   a mounting plate coupled to the housing;
   a pedal coupled to the mounting plate;
   at least one damper operably disposed between the mounting plate and the pedal; and
   a caster mounting sleeve coupled to the caster,
   wherein the pedal is configured to selectively move the caster mounting sleeve to actuate the caster between the retracted position and the extended position, or vice versa, and
   wherein the waste receptacle is selectively configurable in the standing position and in a mobile position in which the waste receptacle is movable along the surface via the at least one retractable caster assembly.

2. The waste receptacle of claim 1, wherein:
   the mounting plate comprises a tubular channel, and
   the caster mounting sleeve is configured to operably slide within the tubular channel.

3. The waste receptacle of claim 2, further comprising a release member coupled to the pedal, wherein the release member and the pedal are configured to work in concert to actuate the caster between the extended position and the retracted position, wherein the tubular channel comprises an elongated aperture through which the release member is anchored onto the caster mounting sleeve.

4. The waste receptacle of claim 3, further comprising a plurality of pivot points disposed on each of the mounting plate, the pedal, the release member, and the caster mounting sleeve, wherein the mounting plate, the pedal, the release member, and the caster mounting sleeve rotate about at least one of the plurality of pivot points.

5. The waste receptacle of claim 4, wherein the plurality of pivot points comprises:
a mounting plate pivot point;
a release member pivot point; and
a caster mounting sleeve pivot point,
wherein the mounting plate pivot point and the caster mounting sleeve pivot point form a plane parallel with the mounting plate, wherein the release member pivot point is configured to actuate between the plane as the caster assembly actuates the caster between the retracted position and the extended position.

6. A waste receptacle, comprising:
a housing defining an inner volume accessible via an opening, the housing comprising a base;
at least one foot fixedly coupled to the base and configured to support the waste receptacle in a standing position; and
at least one retractable caster assembly coupled to the housing, the at least one retractable caster assembly comprising a caster selectively movable between a retracted position and an extended position in which the caster extends past the at least one foot to engage a surface on which the waste receptacle is disposed,
wherein the retractable caster assembly comprises:
a mounting plate coupled to the housing;
a pedal coupled to the mounting plate;
a set of biasing members disposed between the mounting plate and the pedal, wherein the set of biasing members are configured to apply a constant force to the pedal; and
a caster mounting sleeve coupled to the caster,
wherein the pedal is configured to selectively move the caster mounting sleeve to actuate the caster between the retracted position and the extended position, or vice versa, and
wherein the waste receptacle is selectively configurable in the standing position and in a mobile position in which the waste receptacle is movable along the surface via the at least one retractable caster assembly.

7. The waste receptacle of claim 1, wherein the caster is rotatable about a longitudinal axis of the caster mounting sleeve by 360 degrees.

8. A waste receptacle, comprising:
a housing defining an inner volume accessible via an opening, the housing comprising a base;
at least one foot fixedly coupled to the base and configured to support the waste receptacle in a standing position; and
at least one retractable caster assembly coupled to the housing, the at least one retractable caster assembly comprising a caster selectively movable between a retracted position and an extended position in which the caster extends past the at least one foot to engage a surface on which the waste receptacle is disposed; and
a door configured to selectively conceal the at least one retractable caster assembly,
wherein the waste receptacle is selectively configurable in the standing position and in a mobile position in which the waste receptacle is movable along the surface via the at least one retractable caster assembly.

9. A waste receptacle, comprising:
a housing defining an inner volume accessible via an opening, the housing comprising a base;
at least one foot fixedly coupled to the base and configured to support the waste receptacle in a standing position; and
at least one retractable caster assembly coupled to the housing, the at least one retractable caster assembly comprising a caster selectively movable between a retracted position and an extended position in which the caster extends past the at least one foot to engage a surface on which the waste receptacle is disposed,
wherein the waste receptacle is selectively configurable in the standing position and in a mobile position in which the waste receptacle is movable along the surface via the at least one retractable caster assembly,
wherein the waste receptacle further comprises a locking mechanism to selectively lock the waste receptacle in the standing position or in the mobile position.

10. The waste receptacle of claim 9, wherein:
the caster is selectively movable between the retracted position and the extended position via a pedal and a pedal-actuated lever, and
the locking mechanism is associated with the pedal-actuated lever.

11. The waste receptacle of claim 1, further comprising at least one fixed caster fixedly coupled to the base, the at least one fixed caster being sized and positioned such that the at least one fixed caster and the at least one foot provide an approximately level support structure for the waste receptacle in the standing position.

12. The waste receptacle of claim 11, wherein the at least one foot is disposed proximate the at least one retractable caster assembly, relative to the at least one fixed caster.

13. The waste receptacle of claim 1, comprising at least two of the retractable caster assemblies.

14. The waste receptacle of claim 1, further comprising a selectively openable panel through which a receptacle liner is positionable within the waste receptacle.

15. The waste receptacle of claim 1, further comprising at least one internal storage shelf accessible by a door associated with the waste receptacle.

16. A waste receptacle, comprising:
a housing defining an inner volume accessible via an opening, the housing comprising a base;
at least one foot fixedly coupled to the base and configured to support the waste receptacle in a standing position;
at least one internal storage shelf accessible by a door associated with the waste receptacle;
a latch configured to secure the door, wherein the latch is disposed within the inner volume of the housing; and
at least one retractable caster assembly coupled to the housing, the at least one retractable caster assembly comprising a caster selectively movable between a retracted position and an extended position in which the caster extends past the at least one foot to engage a surface on which the waste receptacle is disposed,
wherein the waste receptacle is selectively configurable in the standing position and in a mobile position in which the waste receptacle is movable along the surface via the at least one retractable caster assembly.

17. The waste receptacle of claim 16, further comprising a lock configured to secure the latch.

* * * * *